Sept. 4, 1956  C. T. BATTS  2,761,470
PILOT CONTROLLED VALVES
Filed April 14, 1953  4 Sheets-Sheet 1

INVENTOR:
Carl T. Batts
BY Peck + Peck
ATTORNEYS

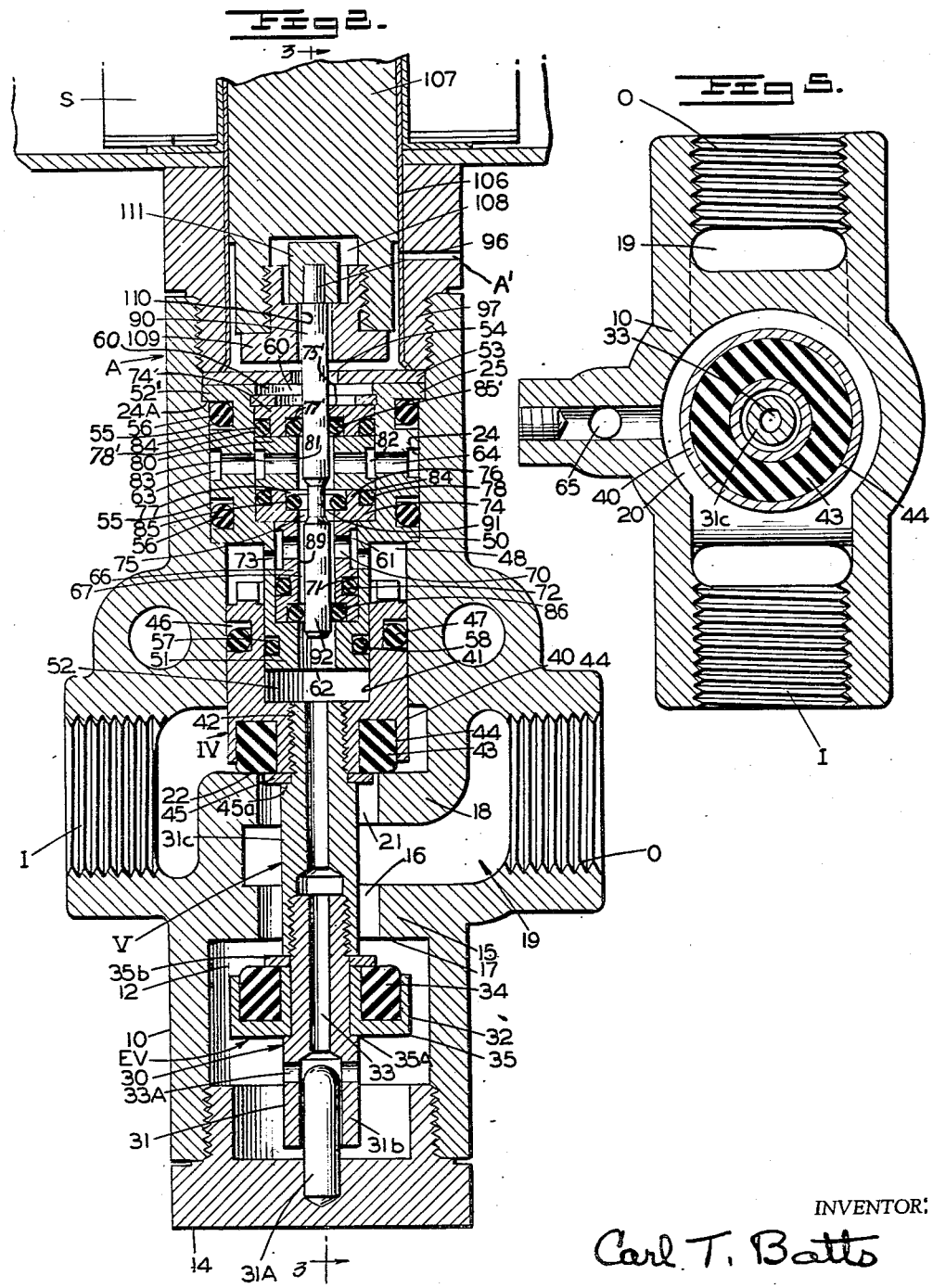

Sept. 4, 1956
C. T. BATTS
2,761,470
PILOT CONTROLLED VALVES
Filed April 14, 1953
4 Sheets-Sheet 3
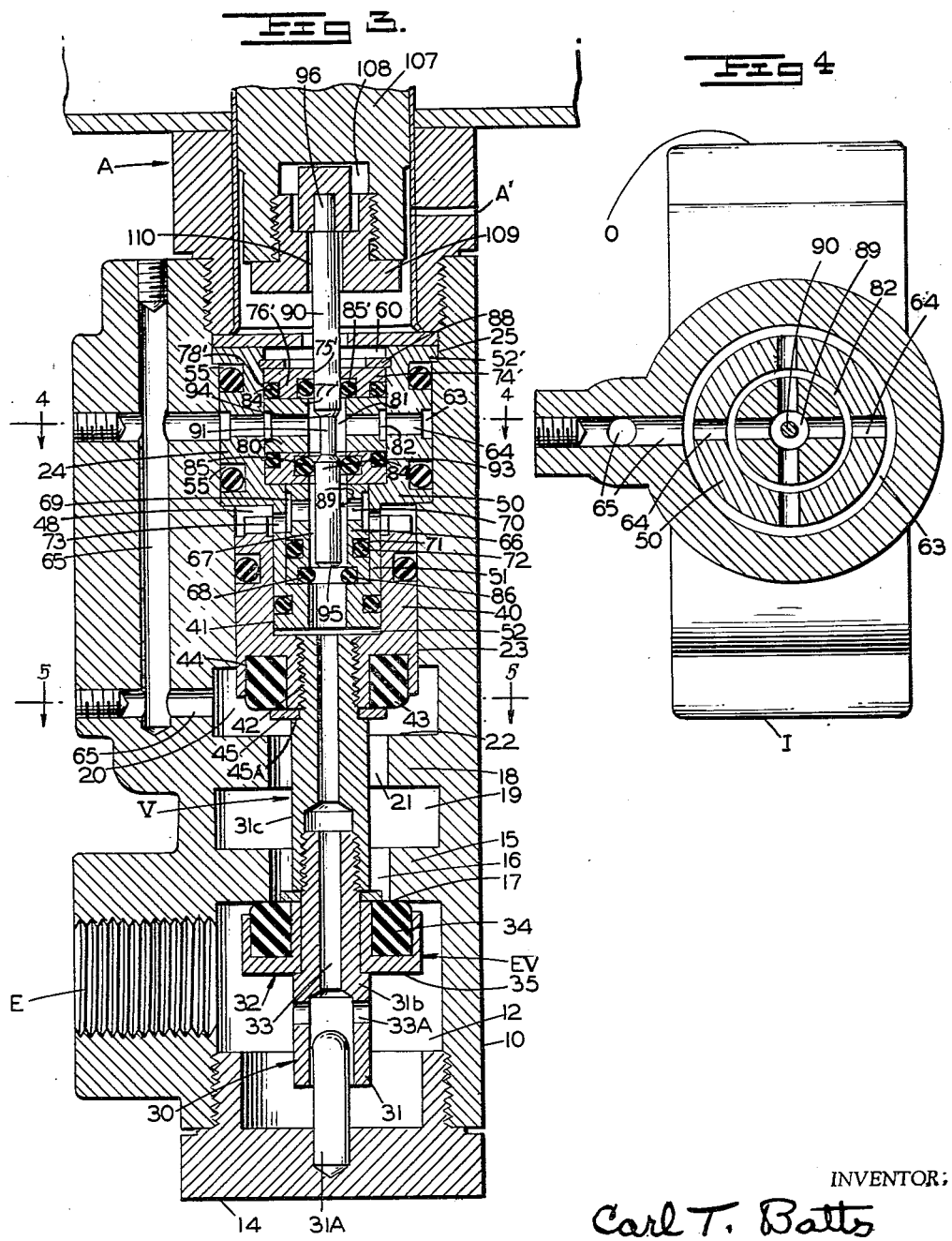
INVENTOR:
Carl T. Batts
BY Peck + Peck
ATTORNEYS.

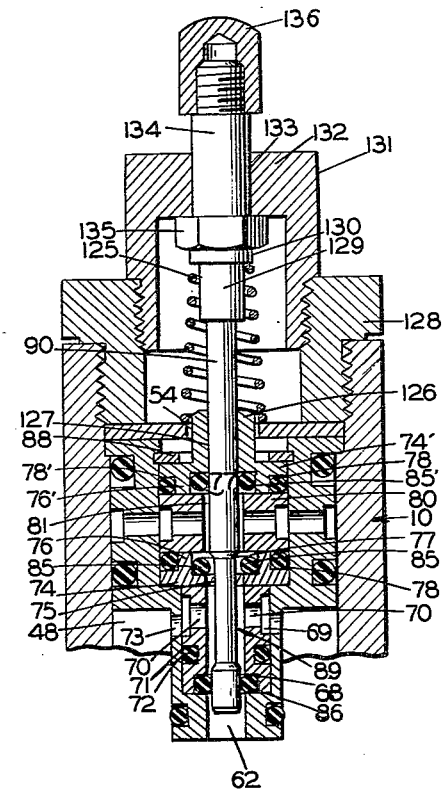

United States Patent Office 2,761,470
Patented Sept. 4, 1956

2,761,470

PILOT CONTROLLED VALVES

Carl T. Batts, San Marino, Calif.

Application April 14, 1953, Serial No. 348,656

2 Claims. (Cl. 137—620)

This invention relates to improvements in pilot controlled valves; and the nature and objects of the invention will be readily recognized and understood by those skilled in the arts to which the invention pertains in the light of the following explanation and detailed description of the accompanying drawings illustrating what I now consider to be a preferred embodiment or mechanical expression of the several features of my invention from among various other embodiments, expressions, designs, arrangements, constructions, combinations and adaptations, of which the invention is capable within the broad spirit and scope thereof as defined by the claims hereto appended.

My present invention is particularly adapted to and intended for embodiment and expression in valve units of the pilot controlled and solenoid operated types designed for high speed cycling of pressure fluids, such as air, water, light oils or other liquids, to and from a pressure fluid actuated component, such as a cylinder and piston unit adapted for precision operation of a mechanism operatively coupled therewith; and a general object of the invention is to improve the design, construction and assembly of such types of valve units in order to increase the efficiency and precision of operation thereof and to reduce the maintenance required for operation of a valve unit over long periods of operation under the varying working conditions to which such valve units are subjected in operation and use.

These general types of pilot valve controlled and solenoid operated valve units are characterized by an assembly which includes a main valve for controlling the cycling of the pressure fluid, a pilot valve for selectively controlling the operation of the main valve, and a solenoid for actuating the pilot valve to effect operation of the main valve. The main valve is usually operated through its cycling by fluid pressures established from the control of the pressure fluid being cycled by the main valve under the dictation of the solenoid operated pilot valve.

With the fast operation required of this type of valve unit in order to obtain the high speed cycling of the pressure fluid, it is desirable that the pilot valve have as short a stroke as possible and, hence, the solenoid armature which actuates the pilot valve plunger must similarly have a correspondingly short stroke. Under such operating conditions these valve units are usually powered by a solenoid of the alternating current type which within practical design and cost limits must necessarily be operated with a very short armature stroke in order to prevent destructive over-heating of the solenoid coil which would result from the transfer to the coil of the heat generated by the so-called "inrush current" upon the energization of the coil for each stroke of the armature. Further, with such a short stroke and fast operating valve unit, in order to attain high efficiency of operation as well as to obtain compactness and small size and low production cost for the unit, it is essential to have the pressure fluid passages which are necessary for the operation of the main valve from and under the control of the pilot valve, of as short lengths as possible to provide minimum length flow passages to be filled with pressure fluid and from which pressure fluid must be exhausted during the fast operation and high speed cycling of the unit.

In the designs of these types of valve units now generally available on the market, the pilot valve organization is usually mounted in a casing or housing bolted or otherwise secured in position as a substantially separate assembly at the exterior of the body or casing for the main valve, or the pilot valve organization is mounted and assembled in an auxiliary housing or casing formed and projected from a side of the body or casing for the main valve organization. With such designs and arrangements the pilot valve organization is located relatively remote or removed from the main valve organization and this necessitates the provision of pressure fluid flow paths of substantial lengths for the required pressure fluid flow between the main valve and the pilot valve. In certain of such valve units, particularly those intended for cycling liquid pressure fluid, it is necessary to provide at the exterior of the unit, piping or tubing to form certain of the required flow paths, particularly the flow path for returning exhaust fluid from the pilot valve to the main exhaust chamber or exhaust line of the main valve organization. Such relatively long pressure fluid flow paths tend to decrease the efficiency of the valve operation, particularly in the ranges of faster valve operation and the higher speeds of pressure fluid cycling, as well as increasing manufacturing problems and production costs through the requirement for valve units of increased overall length or width dimensions.

It is a further object of the invention to overcome the structural, manufacturing and operational disadvantages of such solenoid actuated pilot controlled valve units having the relatively remotely mounted pilot valve organizations by providing a design and arrangement of valve unit in which the pilot valve organization is substantially completely located and housed within the main valve body or casing without increasing the overall width thereof and with a minimum increase in the overall length of the valve unit while providing more compactly and efficiently arranged flow passages of substantially reduced lengths between the pilot valve and the main valve.

Another object and a feature of the invention resides in providing a design and arrangement of such a valve unit in which the main valve member, the pilot valve plunger and the armature of the solenoid are in substantial axial alignment.

A further object is to provide such a design in which a substantial portion of the pilot valve organization is in effect "nested" and slidably received in the pressure fluid actuated piston of the main valve organization, with that piston reciprocal on and relative to the pilot valve organization, so that there is effected by this close-coupled main valve and pilot valve, a substantial reduction in the overall length of the valve unit and in the lengths of the pressure fluid flow passages required between the pilot valve and the main valve.

Another object and a particular feature is to provide such a design and arrangement in which the pressure fluid passage for exhaust of pressure fluid from the pilot valve organization to the exhaust chamber of the main valve organization is formed axially through the main valve member for discharge directly into the main valve exhaust chamber.

A further object is to provide a pilot valve organization for such a solenoid actuated valve unit in which an improved and efficient arrangement and combination of pilot valve plunger and so-called O-type sealing rings is utilized, so that the O-rings provide the seats for the intake and exhaust ports which are directly engaged in sealing contact with the pilot valve plunger in port closing positions of the pilot valve plunger.

A further object is to provide a simplified and improved design for sealing-off the solenoid from the pilot valve and main valve sections of the unit to thereby prevent access of pressure fluid to the solenoid coil.

A further object is to provide a design of solenoid actuated pilot valve organization which is adapted to embodiment in a wide range of sizes of main valve units to thus eliminate the necessity for different sizes or characteristics of solenoid and pilot valve organizations for different sizes of main valves.

Another object is to provide a design, construction and arrangement of pilot controlled valve unit having the foregoing features and characteristics which is adapted for use with various pressure fluids, including such fluids of liquid forms and for embodiment in valve units adapted for operation over a wide range of speeds in terms of cycles per minute and with a wide range of fluid pressures.

Another object is to provide a design and arrangement of pilot valve controlled valve unit in which balanced conditions are established for the pilot valve.

And another object is to provide a design and arrangement of pilot controlled valve unit adapted equally to operation of the pilot valve by solenoid, manual, mechanical or pilot types of operating means.

With the foregoing and various other objects, features and results in view which will be readily apparent from the following detailed description and explanation of the selected example of my invention, the invention consists in certain novel features in design and construction of parts and elements and in their combination and association, all as will be more fully referred to and specified hereinafter.

Referring to the accompanying drawings in which similar reference characters refer to corresponding parts and elements throughout the several figures thereof;

Fig. 2 is a view in longitudinal section through the valve unit of Fig. 1, with the solenoid de-energized and the main valve conditioned by the pilot valve into pressure fluid inlet closing and pressure fluid exhaust opening position.

Fig. 3 is a longitudinal sectional view through the valve unit taken as on the line 3—3 of Fig. 2, but showing the valve unit in position with the solenoid energized.

Fig. 4 is a view in transverse section taken as on the line 4—4 of Fig. 3.

Fig. 5 is a view in transverse section taken as on the line 5—5, of Fig. 3.

Fig. 6 is a vertical longitudinal section through the pilot valve organization of a modified arrangement thereof with a manual operating means for the pilot valve plunger.

Figure 1:
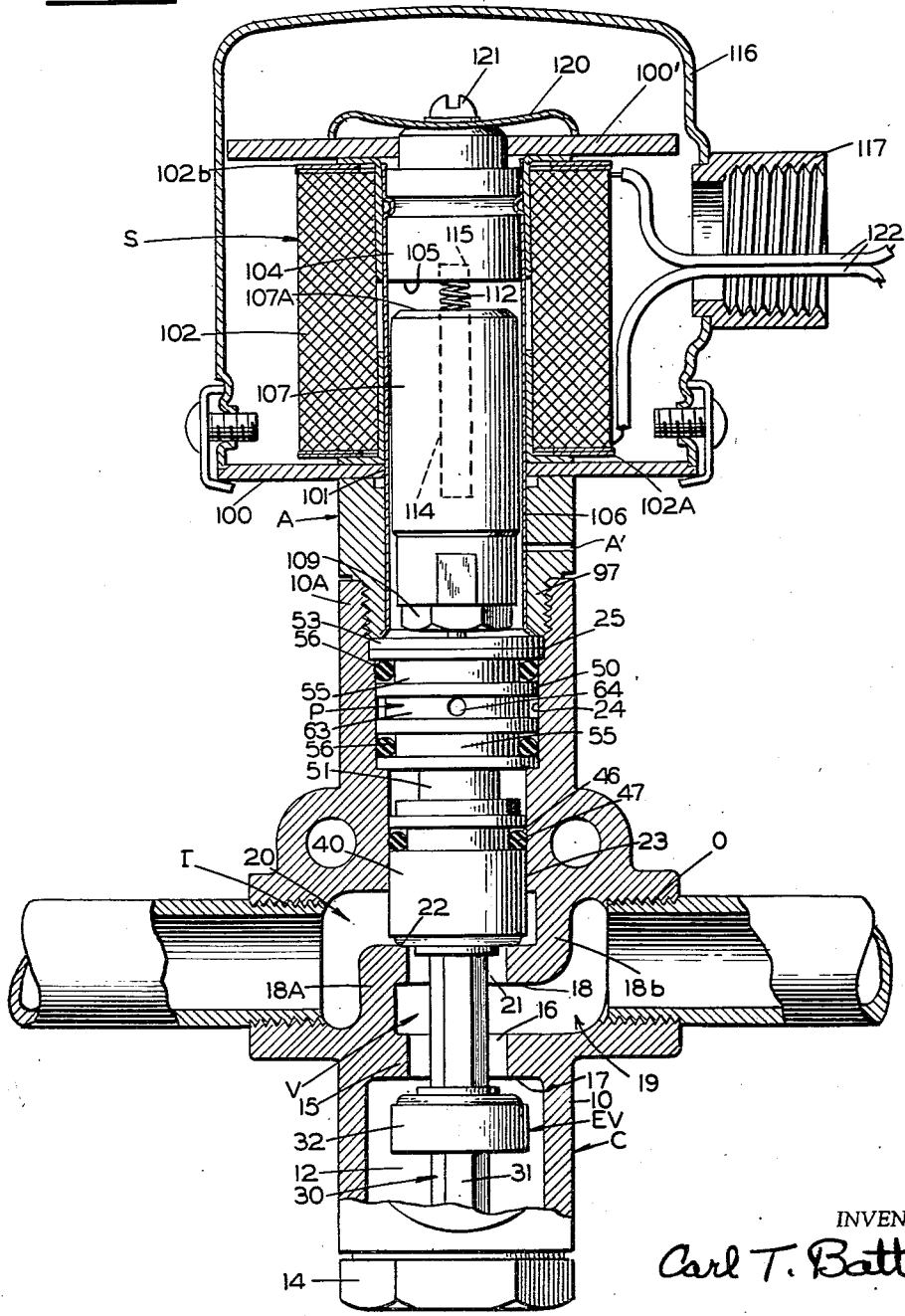
Fig. 1 is a view in longitudinal section through a valve unit embodying and incorporating the several features of the invention, but showing the main valve and pilot valve organizations and the solenoid armature in side elevation.

As an example primarily for purposes of description and explanation, I have selected a solenoid actuated pilot controlled valve unit of my invention of the 3-way type which is particularly adapted and intended for fast operation for high speed valve cycling of pressure fluid for the operation of various types of fluid actuated components, particularly such components as used with various types of automatic machines such as riveting, welding and the like machines. The particular valve unit of the selected example of the invention is adapted for use with fluid pressures in the range from approximately 20 pounds to greater than 500 pounds per square inch, and is capable of operating efficiently with a minimum of maintenance over long and continuous periods of operation at cycling rates in excess of 600 complete cycles of the main valve per minute. It so happens that I have selected for the instant example a valve unit of the so-called ¼" size, that is to say, the free port area of the unit is equal to the internal cross sectional area of a standard ¼" pipe, although the particular size of the valve unit is without limiting significance to my invention. By the selected example of valve unit it is not intended to limit expression or embodiment of my invention to the particular type of the selected example or to the range of fluid pressures or the range of speed of cycling for which this particular example unit is intended or adapted. It is to be understood that the various features of my invention as embodied and expressed in the particular example valve unit hereof, are capable of and are intended to be incorporated in valve units of any desired size or of any desired types of pilot controlled valve units, including units of the so-called 2-way and 4-way main valve types, as well as various combinations thereof.

The valve unit of the example embodiment includes a main valve organization identified generally by the reference character V, a pilot valve organization identified generally by the reference character P, and a pilot valve actuating solenoid identified generally by the reference character S. In this example both the main valve organization V and the pilot valve organization P are of the 3-way type, as will be recognized and understood by those skilled in this art. The main valve organization V and the pilot valve organization P are arranged and assembled in cooperative combination within a casing or housing structure identified generally by the reference character C, while the solenoid S is mounted on and in continuation of the casing or housing C at one end thereof, as will be clear by reference to Figs. 1, 2 and 3 of the drawings. The housing C in this instance consists of a main valve body 10 internally threaded at one end to receive the externally threaded adapter A of the solenoid S which mounts on the valve body 10 in general axial alignment therewith. The main valve organization V is located and positioned within the valve body 10, as is the pilot valve organization with the exception of the pilot valve plunger which projects or extends into the inner end of the adapter A, so that the pilot valve organization is thus located and positioned between the main valve organization V and the solenoid S completely housed within the casing or housing C.

*Main valve organization*

The main valve body 10, in this instance, is generally cylindrical in form, and is formed hollow to provide at one end thereof a main exhaust chamber 12 having an open outer end which is normally closed by the closing nut or cap 14 threaded into the open end of the body 10 in sealing engagement therein. Since this exhaust end of the valve body 10 is normally closed, it will be referred to hereinafter as the inner end of the body 10, while the opposite end of the body 10 will be referred to as the outer end, and all associated parts will be related accordingly to the inner and outer ends of the body 10.

At the outer end of the exhaust chamber 12 the body 10 provides a transverse wall 15 thereacross having a bore therethrough forming the exhaust port 16 located in substantial axial alignment with the major longitudinal axis of the body and of the end closure cap 14. The wall 15 at the exhaust chamber side thereof around the port 16 is machined or suitably faced to provide an annular seat 17 for engagement by the exhaust valve of the main valve unit as will be hereinafter described. The body 10 is also formed to provide a wall 18 thereacross generally parallel with wall 15 but spaced outwardly therefrom and being joined at its opposite sides with the body 10 by the oppositely turned flange walls 18a and 18b. Wall 18 thus forms a discharge or outlet pressure chamber 19 within body 10 between the wall 15 and wall 18. At the outer side of wall 18 there is formed and provided within body 10, the inlet pressure chamber 20. Wall 18 is formed with a bore therethrough to provide the inlet port 21 in axial alignment with the exhaust port 16. Thus, the inlet port 21 is adapted to place the inlet pressure chamber 20 in communication with the outlet pressure chamber 19. The wall 18 around the inlet port 21 at the inlet pressure chamber side thereof is machined or suitably faced to provide an annular seat 22 for seating engagement thereon of the inlet valve of the main valve 5 as will be later described.

The main valve body 10 is formed and provided with the internally threaded inlet I therethrough into the inlet pressure chamber 20, and at the side thereof diametrically opposite inlet I is formed and provided with an internally threaded pressure fluid discharge or outlet O. Intermediate the inlet I and outlet O, the valve body 10 is provided with an internally threaded exhaust outlet E for discharge of exhaust fluid from the main exhaust chamber 12. The pressure fluid may thus flow through inlet I into the inlet pressure chamber 20, from pressure chamber 20 through inlet port 21 into the outlet pressure chamber 19, and from the latter chamber may flow from the valve unit through the outlet O, or may flow from the outlet O through chamber 19 to exhaust chamber 12 and from the latter chamber discharge through exhaust E. As will be understood in the art, the valve unit may be installed in operative connection in a main pressure fluid line by threading the inlet side of that line into the inlet I and the outlet side of the line into the outlet O of the unit, with the exhaust or return line threaded into the exhaust E.

The valve body 10 is provided with a cylinder bore 23 therein in axial alignment with the inlet port 21 and the exhaust port 16, with the inner end of the cylinder bore 23 having unobstructed opening into the inlet pressure chamber 20 opposite and spaced from the adjacent side of transverse wall 18. The valve body 10 at the outer side of cylinder bore 23 is provided with a slightly enlarged diameter counterbore 24 in axial alignment with an outward continuation through the body of the cylinder bore, with this counterbore 24 opening at its outer end in another slightly enlarged diameter counterbore 25 which opens through the adjacent end of the body 10 and which is internally threaded to receive and mount the adapter A.

The main valve member 30 includes a valve stem 31 upon which there is mounted and fixed the exhaust valve EV. The valve stem 31 is mounted in operative position in the valve body 10 extending outwardly through and axially of the exhaust chamber 12 and the exhaust port 16, through the outlet pressure chamber 19, and through the inlet port 21 and into the inlet pressure chamber 20. This valve stem 31 of the main valve member 30 is mounted for reciprocation axially through the exhaust port 16 and inlet port 21 and at its inner end within the main exhaust chamber 12 is slidably mounted on a guide pin 31a secured in fixed position in and extending outwardly from the end closure cap 14 into the exhaust chamber 12 of the valve body. The guide pin 31a is slidably received in an axial bore opening through the inner end of stem 31 for reciprocation of the stem thereon. The external diameter of the valve stem 31 is substantially less than the internal diameters of the exhaust port 16 and the inlet port 21, so that there is constantly maintained an annular passage around the valve stem in each of the ports 16 and 21 for flow of pressure fluid therethrough. The valve stem 31 of the main valve member 30 is provided with an axial bore therethrough to form a pressure fluid passage 33 opening through the outer end of the stem. The inner end of the stem 31 within the main exhaust chamber 12 is provided with a transverse bore therethrough to provide the outlet passage 33a intersecting and into which the passage 33 discharges for discharge of fluid from passage 33 into the exhaust chamber 12. Thus, pressure fluid may flow through the passage 33 from the outer end of the stem 31 and be discharged therefrom into the main exhaust chamber 12 through the discharge outlets 33a. In this specific instance the valve stem 31 is made up of a stud member 31b positioned within the main exhaust chamber 12, and an outer stud member 31c which is threaded onto and over the outer end of stud member 31b, as will be clear by reference to Figs. 2 and 3.

An exhaust valve EV comprised of a rubber or composition valve ring 34 and a valve ring retainer 35, is mounted on the stud 31b of valve stem 31 in fixed position thereon within the main exhaust chamber 12 for reciprocation as a unit with the valve stem to and from seated position on the exhaust valve seat 17. The valve ring retainer 35 is assembled on valve stem stud 31b, clamped and secured in fixed position between a shoulder 35a formed on and around the stud and a clamping disc 35b engaged and held between the end of stem stud 31c and the adjacent end edge of the retainer ring 35. The diameter of the disc 35b is less than the external diameter of the valve ring 34, so that there is exposed an annular surface at the inner side of the valve ring facing the valve seat 17 for seating on and sealing engagement with the valve seat 17.

The stud 31c of the main valve stem 31 projects through the inlet pressure chamber 20 in axial alignment with the cylinder bore 23 which opens into the outer end of that chamber, and this projected end of stud 31c is of reduced external diameter and provided with external threading thereon. A piston 40 is reciprocally mounted within the cylinder bore 23 and is formed and provided with an axial bore 41 therein which opens through the outer end of the piston into the cylinder bore 23. An internally threaded bore 42 is provided axially through the opposite end wall of piston 40, and the externally threaded end of the valve stem stud 31c is threaded into and through this threaded bore 42 of the piston with the outer end of the pressure fluid passage 33 through the valve stem 31 opening into and in communication with the bore 41 of the main valve piston 40.

The inner end of the main valve piston 40 mounts and carries the inlet valve IV of the main valve member, such inlet valve being comprised of a rubber or composition valve ring 43 identical and interchangeable with the valve ring 34 of the exhaust valve EV. This valve ring 43 is mounted within an annular groove or chamber 44 formed in the inner end of piston 40 concentric with the valve stem 31. The valve ring 43 is secured in assembled position by a retaining disc 45 clamped between the inner end of piston 40 and a shoulder 45a formed around stud 31c of the valve stem. The external diameter of the retainer disc 45 is less than the internal diameter of the inlet port 21, while the external diameter of the valve ring 43 is greater than the internal diameter of port 21, to thereby provide an annular surface of the valve ring 43 which is exposed for seating engagement on and against the valve seat 22 in order to close and seal off the inlet port 21. The piston 40 for actuating the main valve member is provided with a sealing ring groove 46 therearound in which there is mounted any suitable piston packing ring, such as the O-ring 47. In this manner the piston 40 has a sealing fit in the cylinder bore 23 and the bore 23 is sealed off by the O-ring 47 against passage or leakage of pressure fluid therethrough from the inlet pressure chamber 20.

Thus, by reciprocation of the piston 40 in the cylinder bore 23 the main valve stem 31 may be moved axially in either direction between the position shown in Fig. 2 in which the exhaust valve EV is displaced from its valve seat 17 to open the exhaust port 16 and the inlet valve IV is moved to position engaged on its seat 22 to close-off inlet port 21, and the position shown in Fig. 3 in which the stem 31 is moved outwardly to a position with exhaust valve EV engaged with seat 17 and closing-off exhaust port 16 and the inlet valve IV displaced to position moved from its seat 22 to thereby open inlet port 21 for passage of pressure fluid from the inlet pressure chamber 20 to the outlet pressure chamber 19.

The length of the piston 40 and of the cylinder bore 23 and the relative positioning of the piston in that bore by the main valve member 30, is such that with the inlet valve IV in closed position and the exhaust valve EV in open position, there is formed at the outer end of piston 40 within bore 23, the chamber 48 into which and from which the pilot valve organization P alternately delivers and exhausts pressure fluid, as will be hereinafter described.

*The pilot valve organization*

The pilot valve organization P is mounted and assembled within the valve body 10 in the counterbore 24 thereof in close-coupled or partially "nested" relation with the main valve organization V and the piston 40 of the main valve member 30. In this manner a compact, minimum length and minimum width valve unit is made possible, and further, and of considerable importance, the pressure fluid passages required for and between the main valve organization and the pilot valve organization are maintained of short lengths with resulting minimum length flow paths.

In this specific example embodiment of my invention, the pilot valve organization P includes the pilot valve housing 50 which is of cylindrical cross section of tubular or sleeve-like form to fit and be relatively tightly received in and to occupy the counterbore 24 in the valve body 10. The pilot valve housing 50 includes a cylindrical reduced diameter axial extension 51 thereof which projects or extends in mounted position of the housing inwardly therefrom into the bore 41 formed in the piston 40, in which bore the housing extension 51 has a tight sliding or piston fit for reciprocation of the piston 40 thereon. In mounted and assembled position, the housing 50 with its reduced diameter extension 51, closes the outer end of the cylinder bore 23 and thus closes the outer side of the pressure chamber 48, as will be clear by reference to Figs. 2 and 3. The length of the reduced diameter housing projection 51 is substantially the same as the length of bore 41 in which it is received, so that in the position of the main valve member 30 with the exhaust valve EV in open position and the inlet valve IV in closed position, there is formed a space or chamber 52 at the inner end of housing extension 51 within the piston bore 41. In the reverse position of the valve member 30 with the exhaust valve EV in closed position and the inlet valve IV in open position, the inner end of housing extension 51 is located at the inner end of the piston bore 41. These relative positions of the piston 40 are shown clearly in Figs. 2 and 3. The housing 50 at its outer end is in this instance formed with a radially outwardly disposed flange 52' therearound of an external diameter to fit within the counterbore 25 and seat upon the shoulder 24a formed at and around the inner end of this counterbore where it joins the counterbore 24. Flange 52' thus locates the housing 50 and the extension 51 thereof in assembled position. A disc 53 having an axial bore 54 therethrough is fitted in counterbore 25 in position over the outer end of housing 50 and its flange 52', this disc serving as a retainer disc and being tightly clamped against the flange 52' of housing 50 in a manner to be hereinafter described.

The housing 50 is formed with the spaced grooves 55 therearound in which are confined the sealing rings 56 of the O-ring type to form fluid tight seals between the housing and the walls of the counterbore 24 to thereby prevent passage of fluid from the pressure chamber 48 outwardly through the counterbore 24. Similarly, the housing extension 51 is formed adjacent its inner end with a groove 57 therearound in which there is mounted and confined a packing ring 58 of the O-ring type to form a fluid type seal between the main valve piston 40 within the bore 41 and the pilot valve housing extension 51 on which the main valve piston 40 has "nested" reciprocal mounting in close-coupled relation therewith.

The housing 50 is of tubular or sleeve form to provide therewithin the cylindrical chamber 60, and the extension 51 of the housing is formed with an axial bore to form a chamber 61 in axial continuation of but of reduced diameter relative to the chamber 60. At its inner end closing wall (relative to the valve unit) the housing extension 51 is formed with an axial bore 62 opening therethrough of reduced diameter relative to the internal diameter of the bore or chamber 61 within the extension. The housing 50 is provided intermediate the O-ring grooves 55, with an annular groove 63 therearound to form a fluid passage or manifold which is closed at its outer side by the adjacent wall of the counterbore 24 of valve body 10. Diametrically opposite and axially aligned radial bores 64 are formed through the side wall of housing 50 to provide fluid flow passages which open at their inner ends into the chamber 60 of the housing. The annular manifold passage 63 in the housing 50 is connected with and supplied with pressure fluid from the main inlet pressure chamber 20 in the valve body 10 by a fluid flow passage 65 formed through the body 10 with its intake end opening in the chamber 20 and its outlet or discharge end opening inwardly through the wall of body 10 into the counterbore 24 in line with the manifold groove 63, as will be clear by reference to Fig. 3.

The pilot valve housing 50 and its extension 51 mount and house therewithin an assembly of components to provide fluid passage controlled by a pilot valve plunger which is reciprocated under the control and dictation of the solenoid S. Such components, in this instance, include an exhaust sleeve 66 mounted and fitted within the bore 61 of the housing extension 51. This sleeve 66 has a length equal to the length of the bore or chamber 61 and a maximum external diameter to form a close tolerance fit in the chamber 61. This exhaust sleeve 66 is formed with an axial bore 67 therethrough having an enlarged diameter counterbore 68 at and opening through the inner end of the sleeve at the inner end of chamber 61 into the bore 62 formed through the inner end of housing extension 51. Adjacent the outer end of the exhaust sleeve 66, an annular manifold groove 69 is formed therearound. Diametrically opposite, radially disposed and axially aligned bores 70 are provided through the side wall of the sleeve to form fluid flow passages which open at their outer ends into the manifold groove 69 and at their inner ends open into the bore 67 through the sleeve. The bores 70 provide fluid flow passages between the manifold groove 69 and the bore 67 through the sleeve 66. Intermediate the inner end of the sleeve 66 and the manifold forming groove 69 therearound, there is provided an annular groove 71 opening through the side of the sleeve for receiving and in which there is mounted a suitable sealing or packing ring 72 of the O-ring type. This O-ring 72 provides a seal between the exhaust sleeve 66 and the wall of the bore 61 of the housing extension 51 to thereby prevent passage of fluid past the sleeve, either from the manifold groove 69 or from the chamber formed by the counterbore 68 at the inner end of the bore or chamber 61 of the housing extension 51 in which sleeve 66 is mounted.

The pressure chamber 48 which is formed at the outer end of the main valve piston 40, between that piston and the inner end wall of the housing 50, is placed in communication with the manifold groove 69 in the exhaust sleeve 66 by the diametrically opposite, axially aligned passages or ports 73 formed through the side wall of housing extension 51 in locations thereon in line with and opening into the manifold groove 69. Thus, pressure fluid may flow between axial bore 67 of the exhaust sleeve 66 and the pressure chamber 48 through the bores or passages 70, the manifold groove 69 and the ports 73.

A sealing ring retainer 74 in the form of a circular disc having an axial bore 75 therethrough and an external diameter to fit with close tolerance in the chamber 60 of the pilot valve housing 50, is mounted and positioned at the inner end of chamber 60. This ring retainer 74 is formed with an annular flange 76 extended axially from the outer side thereof spaced from but concentric with the bore 75 to form therewith the circular chamber 77. The flange 76 is inset or spaced inwardly from the peripheral edge of disc 74, so that in mounted position thereof an annular chamber 78 is formed therearound between the surrounding wall of the chamber 60 of housing 50 and the flange.

A pressure sleeve 80 in the form of a circular block or plug having an axial bore 81 therethrough is mounted within chamber 60 of the housing 50 at the outer side of the retainer disc 74 in abutting engagement with and seated against that disc. The pressure sleeve 80 has an external diameter to form a close tolerance fit with the wall of chamber 60 and in mounted and assembled position the sleeve 80 at its inner side closes the outer side of the annular chamber 78 of the retainer disc 74. In assembled position pressure sleeve 80 also partially closes the axial chamber 77 of the retainer disc 74 due to the fact that the diameter of the bore 81 of the pressure sleeve 80 is less than the diameter of the circular chamber 77 in the disc. However, the bore 81 of the sleeve 80 is of substantially the same diameter as the bore 67 of the exhaust sleeve 66 with the bores 67 and 81 being in axial alignment.

The pressure sleeve 80 is formed with an annular manifold forming groove 82 therearound intermediate the opposite ends thereof. Diametrically opposite axially aligned bores 83 are formed radially through the sleeve 80 with their inner ends being open into the bore 81 and their outer ends being open into the manifold groove 82. The thickness or axial length of the inner retainer disc 74 and of the pressure sleeve 80 is such that in assembled position the manifold groove 82 is located opposite and in line with the inner ends of the flow passage forming bores 64, respectively, through the side wall of the pilot valve housing 50.

A retainer disc 74', in all respects identical with the retainer disc 74, is mounted in the outer end of the chamber 60 at the outer side of the pressure sleeve 80. In this instance the retainer disc 74' is reversed in position relative to the innermost disc 74, in that the flange 76' thereof is located at the inner side in abutting engagement on and against the outer side of the pressure sleeve 80. With the retainer disc 74' so mounted there is formed the closed annular chamber 78' around the outer peripheral side of disc 74', and the inner chamber 77' surrounding and opening into the bore 81 of the pressure sleeve 80. The bore 75' of the retainer disc 74' opens at its outer end into the outer end of the chamber 60 of the housing 50 at the outer side of this disc.

A packing or sealing ring 84 of the O-ring type is mounted in the annular chambers 78 and 78', respectively, of the inner and outer retainer discs 74 and 74', with each of these sealing rings 84 being in sealing engagement between the disc in which it is mounted and the adjacent surrounding wall of the chamber 60 of the pilot valve housing 50. In this manner these packing rings 84 seal against passage of pressure fluid from the manifold 82 of the pressure sleeve 80 between such pressure sleeve and the surrounding adjacent wall of the pilot valve housing 50.

Within the circular chamber 77 formed in the innermost retainer disc 74, and between that disc and the pressure sleeve 80, there is mounted a packing ring 85 of the O-ring type in position therein surrounding and concentric with the aligned axial bores 75 of retainer discs 74 and 81 of pressure sleeve 80. Such packing or sealing ring 85 is of the usual O-ring type familiar in the art and formed of a suitable elastic or resilient material. The ring 85 has a normal internal diameter which is slightly less than the diameter of the adjacent bores 75 and 81 with which it is concentrically mounted. This sealing ring 85 is adapted to and provides the inlet valve port and seat for the pilot valve plunger which is reciprocally extended therethrough in a manner to be later described.

A packing or sealing ring 86 of the O-ring type and similar in characteristics and in dimensions to the inlet valve seat forming O-ring 85, is mounted and confined within the chamber 68 formed in the inner end of the exhaust sleeve 66 and between that sleeve and the inner end of the pilot valve housing extension 51. This sealing O-ring 86 has the internal diameter thereof slightly less than the diameter of the aligned axial bores 67 through the exhaust sleeve and 62 through the inner end of the housing extension 51, so that in normal, unloaded condition thereof the ring projects a slight distance inwardly beyond the plane of the walls surrounding the bores 67 and 62. This sealing O-ring 86 is adapted to provide and define the exhaust port and exhaust valve seat for the pilot valve plunger of the pilot valve organization as will be hereinafter described.

Within the circular chamber 77' formed in the retainer disc 74', and between that disc and the pressure sleeve 80, a packing ring 85' is mounted in position therein surrounding and concentric with the aligned bores 75' of the retainer discs 74' and 81 of the pressure sleeve 80. The sealing ring 85' is similar to the ring 85 and has a normal internal diameter which is slightly less than the diameter of the adjacent bores 75' and 81 with which it is concentrically mounted. The ring 85' is adapted to engage and form a continuous seal with the pilot valve plunger to be described hereinafter, which is reciprocally extended therethrough. Thus, the pressure fluid receiving bore 81 is sealed-off from the space at the outer side of retainer disc 74' and between that disc and the disc 53 over the outer end of the housing 50.

The complete assembly of the exhaust sleeve 66, the inner retainer disc 74, the pressure sleeve 80, and the outer retainer disc 74', together with the associated sealing and packing O-rings including the inlet and exhaust valve seat forming O-rings 85 and 86, is removably secured in position in the valve body 10 by the snap ring 88 which is releasably recessed into the valve housing 50 at the outer end of the chamber 60 in clamping engagement with and against the outer side of the outermost retainer disc 74'. In such assembled position of the above identified components there is provided an axial bore, identified generally by the reference character 89, which extends through the assembly and opens at its inner end into the inner end of bore 41 of the main valve piston 40 and at its outer end into the outer end of chamber 60 of housing 50 at the inner side of the retainer disc 53. This bore 89 is thus comprised of the axially aligned bores 62, 67, 75, 81 and 75', and is adapted to receive the pilot valve plunger 90 for reciprocation therein.

The pilot valve plunger 90 in this example embodiment of the invention, is comprised by a rod of cylindrical cross section having an external diameter less than the minimum internal diameter of its receiving bore 89 but slightly greater than the normal internal diameters of the valve seat forming O-rings 85 and 86. The pilot valve plunger 90 is formed intermediate its length with an annular groove therearound to provide the reduced diameter portion 91. The length of the portion of the plunger 90 between the reduced diameter portion 91 and the inner end of the plunger provides the exhaust valve forming portion 92 adjacent such inner end and the inlet valve forming portion 93 adjacent the inner end of the reduced diameter portion.

The pilot plunger 90 at opposite ends of the reduced diameter portion 91 is beveled, chamfered or rounded to provide the shoulders 94 therearound. The inner end 95 of the plunger 90 is preferably beveled or tapered, while the opposite or outer end thereof is formed of reduced diameter to provide the attachment shank or stud 96.

The pilot valve plunger 90 is positioned centered in and extending through the bore 89 of the pilot valve organization, and in the specific example hereof, the pilot valve plunger 90 in its maximum position of inward displacement into bore 89 has the exhaust valve portion 92 thereof extended through the exhaust valve seat forming O-ring 86 in sealing engagement therewith to seal-off and close the exhaust port formed by and through the ring 86. In such position of the pilot plunger 90, as shown in Fig. 2 of the drawings, the reduced diameter portion of the plunger formed by the annular groove 91 is extended through and positioned in the inlet valve seat forming ring 85, so that the inlet port through that ring is open. As the external diameter of the pilot valve plunger 90 is less than the minimum diameter of the bore 89 in which it is received, there is provided an annular flow passage around the plunger and through the bore 89. In the reverse position with the pilot valve plunger 90 at its limit of outward movement through the bore 89, as determined by the length of the stroke of the armature of the solenoid S, the exhaust valve forming portion 92 thereof is displaced outwardly clear of and opening the exhaust port through the exhaust seat forming O-ring 86, while the inlet valve forming portion 93 of the plunger is moved into and through the inlet seat forming O-ring 85, with the latter ring then in sealing engagement with valve portion 93 to thereby seal-off and close the inlet port through ring 85, as will be clear by reference to Fig. 3 of the drawings. When the pilot valve plunger 90 is in the position closing the exhaust port through ring 86 and opening the inlet port through ring 85 (see Fig. 2), pressure fluid may thus flow from the main inlet pressure chamber 20 to the pressure chamber 48 in the cylinder bore 23 at the outer end of main valve piston 40, but is closed-off from escape or exhaust from chamber 48 by the pilot plunger exhaust valve 92 which is then engaged in the O-ring 86 in sealing contact therewith to thereby close the exhaust port through the ring. When, however, the pilot valve plunger 90 is in the reverse position (see Fig. 3), with the exhaust port formed by ring 86 open and the inlet port formed by ring 85 closed, inlet and discharge of pressure fluid into the pressure chamber 48 is shut off while the pressure fluid in the chamber 48 may then discharge and exhaust therefrom through the open exhaust port formed by ring 86, to the main exhaust chamber 12 of the main valve organization V.

It is to be noted that the sealing ring 85' in the chamber 77' of the retainer disc 74' is in constant sealing engagement with the pilot valve plunger 90 and thus functions to seal-off the bore 81 from the space at the outer side of disc 74' within the chamber 60 of the housing 50. In this manner pressure fluid is prevented from passing outwardly from the bore 81 and through bores 75' of retainer disc 74' and bore 54 of disc 53, into the adapter A. As the pilot valve plunger 90 is in constant sealing engagement with either the sealing ring 85 or the sealing ring 86, the inner portion of the pressure fluid space in bore 89 around the pilot valve plunger portion 91 is always sealed-off from the main exhaust chamber 12. The main exhaust chamber 12 is at atmospheric pressure, so that the pressure at the inner end of the pilot valve plunger 90 at the inner side of either the sealing ring 85 when the valve plunger is in position engaged in such ring (see Fig. 3), or the inner side of ring 86 when the plunger is in position engaged in the latter ring (see Fig. 2), will always be atmospheric pressure. In order to insure the maintainance of atmospheric pressure at the outer or upper end of the pilot valve plunger 90 at the outer side of the sealing ring 85', I have provided in the example valve unit of my invention, a vent passage or duct A' which extends through the side wall of the adapter A and through a guide tube 106 mounted in the adapter, to thereby place the space within the adapter in direct communication with the atmospheric. Since the diameter of the plunger 90 at the sealing ring 85' is the same as the diameter thereof at the sealing rings 85 and 86 whenever the plunger 90 is in sealing engagement with one or the other of the latter rings, it follows that in having established an atmospheric pressure condition on the outer side of sealing ring 85' and alternately on the inner sides of sealing rings 85 and 86, the plunger 90 may be said to be in balance and a minimum amount of force will be required to move it from one control position to another.

*The solenoid*

As one form of operating means for the pilot valve of my invention, I have disclosed a solenoid S of the socalled pull-type, the general design, construction and operating characteristics of which are well known to those familiar with this art. It is to be understood, however, that this particular type of solenoid, or the specific expression thereof here shown, is in no sense disclosed by way of limitation but only by way of example for purposes of explaining the operation of a pilot controlled valve unit of my invention.

The solenoid S in the example form is mounted and carried in assembled position in the valve unit on the adapter A. This adapter A is in the form of a coupling sleeve member having an externally threaded, reduced diameter end 97 which is threaded into the internally threaded end 10a of the valve body 10 in position in axial continuation of that body and with the inner end edge of the threaded end 97 of the adapter engaged against and clamping the retainer disc 53 in position securing the pilot valve housing 50 in assembled position in the main valve body.

A guide tube 106 which is made of non-magnetic material, in this instance a stainless steel, is fitted into and through the adapter A and a disc or washer 100 of magnetic steel is placed on and against the upper face of the adapter A with the adapter and disc 100 brazed to the guide tube 106 so that a hermetic seal is formed. The magnetic material disc 100 is formed with an axial bore 101 therethrough in axial alignment with and of the same diameter as the internal diameter of the axial bore through the adapter A. The outer or upper end of the guide tube 106 is closed by a plug or butt 104 formed of magnetic steel, preferably a stainless steel, and this butt 104 is brazed to the tube to fix the butt in its permanent position therein, as well as to provide a hermetic seal between the butt and the tube.

A conventional coil 102 of suitable winding is installed in position over and surrounding the outer end length of the guide tube 106 with an insulating washer 102a separating the face of the lower or inner end of the coil 102 from the upper or outer face of the magnetic washer 100. The length of the guide tube 106 is such that the inner end face 105 of the butt 104 will be positioned spaced inwardly a distance within the guide tube from the outer end of the coil. A magnetic steel washer or disc 100' is positioned on the outer end of the coil 102 and is insulated from the coil by an insulating washer 102b. A spring clip 120 is secured and attached to the outer end of the butt 104 by a screw 121 in order to secure the foregoing components into position making-up the solenoid assembly. The complete assembly is closed by a casing 116 which may be releasably mounted and attached to the inner magnetic disc 100 in any suitable manner. This casing 116 is provided with a suitable conduit fitting 117 through which the lead wires 122 of the coil 102 may be brought for connection with any suitable power supply.

The solenoid S includes the armature or plunger 107 which, in this example, is formed of a stainless steel, solid member of generally cylindrical cross section with an external diameter slightly less than the internal diameter of the guide tube 106 in which the armature is mounted for free reciprocation. The armature 107 is mounted in the guide tube 106 between the butt 104 and the retainer disc 53 located at the inner end of the adapter A. The inner face 105 of the butt 104 is machined square with the axis of the guide tube 106 for full seating engagement with the outer end face 107a of the armature 107, which latter surface is also machined square with the axis of the armature.

The solenoid S of the present example is in the form of a pull-type solenoid, although it will be perfectly clear to those familiar with the art that a push-type solenoid can be used equally as well as an operating means for the pilot valve of the valve unit of my invention.

With a pull-type solenoid, such as the solenoid S, means is provided for coupling the armature of the solenoid to the pilot valve plunger. Such coupling means may take the form of the example embodiment thereof shown in Figs. 2 and 3 of the drawings. The inner or lower end of the armature 107 is provided with an internally threaded axial bore 108 therein adapted to receive the externally threaded and headed nut 109. This nut 109 is formed with an axial bore 110 extending therethrough having a diameter slightly greater than the external diameter of the outer end length of the pilot valve plunger 90 which is adapted to be received therein in position extending therethrough. The coupling assembly is made by passing the pilot valve plunger 90 through the axial bore 110 in the nut 109. The outer or upper end of plunger 90 is provided with a cap 111 which is brazed or otherwise suitably secured thereto and which has an external diameter greater than the diameter of the bore 110. The bore 110 is counter bored at the outer or upper end thereof to receive therein the pilot valve plunger cap 111. The nut 109 is threaded into the bore 108 of the armature 107 and is drawn up tightly into the bore of the armature. As the diameter of the bore 110 in the nut 109 is slightly greater than the external diameter of the pilot valve plunger 90, the armature 107 is left free for limited movements from side to side in the guide tube 106 during reciprocation thereof without applying side thrust to the pilot valve plunger 90 during reciprocation of this plunger through the O-rings 85' and 86.

In this pull-type of solenoid S the armature 107 is moved outwardly by energization of the coil 102 but is moved inwardly through its return stroke by the coiled expansion spring 112 which is mounted between the armature 107 and the butt 104 of the solenoid. In this example the armature 107, referring now to Fig. 1, is formed with an axial 114 extending therein through the outer end of the armature facing the inner end of the butt 104. The inner end of butt 104 is formed with an axial recess 115 therein in axial alignment with the bore 114 of the armature for receiving one end of the spring 112. The spring 112 is mounted in the bore 114 of armature 107 with its inner end engaged at the inner end of the bore 114 and with its outer end received in the recess 115 in the inner end of the butt 104 in engagement with the butt. In the example valve unit of my invention here disclosed, the stroke of the armature 107 is governed by the stroke of the pilot valve plunger 90 which is required to fully open and fully close the inlet and exhaust ports formed by the O-rings 85 and 86 respectively, of the pilot valve organization.

*Operation*

The main valve organization V of the example embodiment of valve unit of my invention, is of the normally closed type, that is, when the solenoid S is de-energized the main valve member 30 is in position with the inlet valve IV closed and the exhaust valve EV open. This normally closed position of the main valve is shown in Fig. 2 of the drawings. The main valve member 30 is operated solely by fluid pressures acting thereon which are selectively established ad set up under the control of the pilot valve organization P. In the normal closed position of the main valve with the solenoid S de-energized, the pilot valve plunger 90 has been moved inwardly on the spring biased stroke of the solenoid armature 107, to the position shown in Fig. 2 in which the exhaust port formed by the O-ring 86 is closed by valve portion 92 of the plunger, while the inlet port formed by the O-ring 85 is opened by the reduced diameter portion 91 of the plunger.

In the main valve closed position of the pilot plunger 90, pressure fluid is discharged into the pressure chamber 48 at the outer side of the piston 40 of the main valve member 30. This pressure fluid flows into the chamber 48 from the main inlet pressure chamber 20 of the main valve organization V, through the flow path consisting of the passage 65 in the valve body 10; the manifold groove 63 in pilot valve housing 50; the radial passages 64 through housing 50; the manifold groove 82 in the pressure sleeve 80 and the radial passages 83 therefrom through that sleeve; the pilot valve plunger bore 89; the inlet port through O-ring 85; the radial passages 70 and the manifold groove 69 in the exhaust sleeve 66; and the radial passages 73 through the pilot valve housing extension 51 which open into the pressure chamber 48. Passage or flow of the pressure fluid so admitted into the pilot valve plunger bore 89, inwardly through that bore to the open inner end thereof, is sealed-off or prevented by the plunger 90 which is in position in the O-ring 86 in sealing contact therewith to thereby close the exhaust port therethrough.

Under the conditions outlined above it will be clear that the pressure of the fluid in chamber 48 is exactly equal to pressure of the fluid in chamber 20. And since pressure fluid is always seeking an escape to atmosphere, certain forces are being applied to the piston 40 of valve member 30 to move the latter in one direction or another. The pressure fluid in chamber 20 applies a force to piston 40 to move said piston outwardly into the chamber 48. As hereinbefore noted, chamber 48 communicates with exhaust chamber 12. The pressure fluid in chamber 20 is also seeking to escape directly into exhaust chamber 12 through the medium of inlet port 21, outlet chamber 19 and exhaust port 16, and to carry with it valve member 30. A force is thus applied to move valve member 30 inwardly. The pressure fluid in chamber 48 is applying an additional force to piston 40 to move it inwardly. The sum of the two latter forces is substantially greater than the first, with the result that the main valve member 30 is forced to and maintained in inlet valve closed and exhaust valve opened position, as shown in Fig. 2.

With the main valve member 30 in its normally closed position as above described, the solenoid S is then energized to operate the valve member 30 on its reverse stroke to a poistion with the inlet valve IV thereof opened and the exhaust valve EV closed, so that pressure fluid may then flow from the inlet chamber 20 through the inlet valve port 21 and the outlet chamber 19 to the outlet O from the main valve body 10. The energization of the solenoid S instantly draws the armature 107 on its outward stroke to displace the pilot valve plunger 90 to the position thereof shown in Fig. 3. Such displacement of plunger 90 moves the inlet valve portion 93 thereof into the O-ring 85 in sealing contact with that ring and thereby closes the inlet port through the ring 85 and shuts off the flow of pressure fluid into the pressure chamber 48. Simultaneously with the closing of the inlet port through O-ring 85, the exhaust valve portion 92 of the pilot valve plunger 90 is moved outwardly to a position withdrawn from the O-ring 86 and thereby opens the exhaust port formed by that ring, so that with the pressure fluid flow to chamber 48 shut off and the exhaust port provided by ring 86 then being opened there is a discharge of pressure fluid from and a release of pressure in chamber 48. With the opening of the exhaust port through O-ring 86, the pressure fluid in chamber 48 then discharges and flows therefrom for exhaust to atmosphere through the main exhaust opening E from the valve body 10, through a flow path constituted by the radial passages 73 through the side wall of pilot valve housing extension 51; the manifold groove 69 and the radial passages 70 in the exhaust sleeve 66; the pilot valve plunger bore 89; the bore 62 through the inner end of housing extension 51; the chamber 52; the bore 33 through the valve stem 31 and the passages 33a through the stem into the main exhaust chamber 12; and from that chamber 12 to atmosphere through the main valve exhaust E.

This exhaust of pressure fluid from and release of pressure in chamber 48 takes place instantly with the opening of the exhaust port through O-ring 86 by the pilot valve plunger 90. With the removal of the pressure in chamber 48 one of the forces applied to piston 40 to move it and valve member 30 inwardly is eliminated. And since the remaining force applied to valve member 30 to move it inwardly is substantially less than the force continually applied to piston 40 of valve member 30 to move it outwardly, the main valve member 30 will be moved outwardly immediately to a position in which the inlet valve IV is displaced from its seat 22 to open inlet port 21 while at the same time the exhaust valve EV is moved to position engaged on its seat 17 to thereby close the exhaust port 16. This position of the main valve member 30 and of the pilot valve plunger 90 is shown in Fig. 3 of the drawings. With such position of the main valve member 30 and the valves IV and EV thereof, pressure fluid may then flow through the valve unit from the inlet I through inlet valve port 21 and outwardly through the main outlet O of the unit to the pressure fluid operated component which is to be actuated under the control of the valve unit.

Thus, a complete cycle of the main valve member 30 includes a displacement thereof in one direction to open the main inlet valve IV and close the main exhaust valve EV and a displacement in the opposite direction to return it to its normally closed position in which the main inlet valve is closed and the exhaust valve is opened. This complete cycle is carried out under the control and dictation of the pilot valve plunger 90 which is axially aligned with the main valve member 30 and is moved against the force of the biasing spring 112 through its stroke to effect opening of the main inlet valve by energization of the solenoid S, and is moved through its reverse stroke to effect return of the main valve to its normal closed position by the return stroke of the armature 107 of the solenoid S under the biasing action of the armature spring 112 when solenoid S is de-energized. With the armature 107 of the solenoid S and the pilot valve plunger 90 which is positively and closely coupled thereto, having a very short stroke, it follows that an extremely rapid operation of the pilot valve organization can be had with resulting extremely fast cycling of the main valve V between normal closed position and open position. The complete control and timing of the cycling of the valve unit is under the dictation of the solenoid S and dependent upon the rate of speed of the energizing and de-energizing cycle of this solenoid. With the "nesting" or close coupling of the main valve organization V and the pilot valve organization P, the resulting short fluid pressure flow paths therebetween contribute to the efficiency of the operation.

Manual operation

As hereinbefore pointed out and explained, valve units embodying my invention are not limited or restricted to the solenoid types of operating means, but are equally well adapted for manual, mechanical or pilot types of operating means, due to the compact central organization, the relatively small forces involved in the operation of the pilot valve and the various other factors and characteristics of a unit of the invention as hereinbefore described and explained. As an example of an operating means other than the solenoid types, I have in Fig. 6 of the drawings disclosed a form of manual operating means for the selective actuation and control of the pilot valve plunger 90 of the example form of valve unit of the invention for effecting the hereinbefore described operation of the main valve of the unit.

In the example form of manual operating means, the pilot valve plunger 90 thereof is biased outwardly by a coiled biasing spring 125. The outer O-ring retainer disc 74' is formed with an axial boss 126 extending outwardly therefrom through the bore 54 in the disc 53 with the outer end of this boss adapted to receive thereover and center the biasing spring 125. Boss 126 is formed with an axial bore 127 which extends therethrough in axial alignment with the bore 75' in the retainer disc 74'. The bore 127 has a diameter to form a close fit with and to slidably receive therethrough the pilot valve plunger 90 to thereby hold this plunger concentric with the O-rings 85' and 86 during reciprocation of the plunger. An annular, ring-like nut member 128 is substituted in the unit of Fig. 6 for the adapter A of the form of the valve unit of Figs. 1 through 3, and this nut member 128 is threaded into the end of the valve body 10 in the manner hereinbefore described with respect to the adapter A.

The pilot valve plunger 90 extends outwardly through the bore 127 of the boss 126 and through the nut member 128. The valve plunger 90 at its outer end is provided with a cap member 129 which is fixedly attached thereto. This cap member 129 is formed or provided with an annular shoulder or flange 130 at the outer end thereof which extends radially therefrom and therearound. The biasing spring 125 is mounted on and over the pilot valve plunger 90 between the boss 126 on retainer disc 74' and the flange 130 of the cap member 129. A cup-like head member 131 is threaded into the outer end of the assembly nut member 128 to provide the outer end wall 132 having an axial bore 133 therethrough in general axial alignment with the pilot valve plunger 90. A bolt 134 having a head 135 is mounted in position extending through the bore 133 of member 131, with the head 135 of this bolt being positioned at the inner side of member 131 in contact engagement with the outer end face of the cap member 129 which is affixed on the pilot valve plunger 90. The outer end of the bolt 134 is threaded into and mounts thereon a push button 136 for manual depression of the bolt 134 to thereby move the pilot valve plunger 90 inwardly to the position in which the plunger is in sealing engagement with O-ring 85 and is displaced from sealing engagement with O-ring 86 to thereby open the exhaust port formed by the latter O-ring. Upon release of the manually applied forces from the push button 136, the biasing spring 125 which is then under compression acts to restore the pilot valve plunger to its normal position shown in Fig. 6 in which the plunger is in sealing engagement with O-ring 86 and displaced from engagement with O-ring 85 to thereby open the inlet port formed by the latter ring.

It is to be here noted that the arrangement of the valve unit and the pilot valve plunger 90 thereof in the manually operated form of Fig. 6 is well adapted for operation by a solenoid of the push type, in that the biasing spring 125 maintains the pilot valve plunger in outwardly displaced position with the exhaust valve forming O-ring 86 closed and the inlet valve O-ring 85 open, while inward displacement of plunger 90 against biasing spring 125 will move the plunger to position closing O-ring 85 and opening O-ring 86.

While I have shown in the selected example, a main valve of the normally closed type, valve units of my invention are in no sense so limited, as the main valve unit may as readily be of the normally open types as will be recognized by those skilled in the valve art. Hence, normally open and normally closed main valves are to be considered as full equivalents insofar as my present invention is concerned.

It will also be evident that various other changes, modifications, variations, substitutions, additions and eliminations may be resorted to without departing from the broad spirit and scope of my invention and, hence, I do not desire to limit my invention in all respects to the exact and specific disclosures of the examples of the invention herein described, except as may be required by specific intended limitations thereto included in any of the appended claims.

What I claim is:

1. In a valve unit of the pressure fluid cycling type, in combination; a casing formed to provide therewithin adjacent one end thereof, a pressure fluid inlet chamber, a pressure fluid outlet chamber, a pressure fluid exhaust chamber adapted to be maintained at atmospheric pressure, and fluid flow passages between said chambers; a main valve member reciprocally mounted in said casing disposed longitudinally thereof for selectively controlling flow of pressure fluid through said passages between said chambers; said casing having a cylinder therewithin adjacent the outer end of said main valve member in axial alignment therewith; a piston reciprocally mounted in said cylinder attached at one end to the adjacent end of said main valve member for reciprocating the latter; a pilot valve organization mounted within said casing adjacent the outer end of said cylinder and including a housing assembly having an axial bore therethrough and a pilot valve plunger reciprocally mounted in position extending through said bore in axial alignment with said cylinder, said valve plunger having an external diameter less than the diameter of said bore providing a fluid flow passage therepast through the said bore; sealing ring members in said housing assembly in positions concentric with but spaced apart axially of said bore through said assembly and being adapted to receive therethrough in sealing engagement therewith said pilot valve plunger to seal-off the portion of said axial bore between said sealing members from the portions thereof at the opposite outer sides of the said sealing members; said casing and said pilot valve housing assembly being formed to provide a fluid flow passage therethrough from said inlet chamber to the axial bore through said housing assembly and from said axial bore to and discharging into the end of said cylinder opposite said main valve member; said piston and said main valve member formed to provide a fluid exhaust passage therethrough from the end of said cylinder opposite said main valve member to and opening through the opposite end thereof into said exhaust chamber; said pilot valve plunger being formed to selectively control the flow of pressure fluid into and from the end of said cylinder upon reciprocation of said plunger; and means for reciprocating said pilot valve plunger.

2. In a fluid control valve unit, in combination, a casing formed to provide therewithin adjacent one end thereof a fluid inlet chamber, a fluid outlet chamber, a fluid exhaust chamber, and fluid flow passages between said chambers; a main valve member reciprocally mounted in said casing disposed longitudinally thereof extending into said exhaust chamber for controlling flow of fluid through said passages between said chambers; said casing having a cylinder formed therewithin adjacent the outer end of said main valve member in axial alignment therewith; a piston reciprocally mounted in said cylinder; said piston being connected at one end to the adjacent end of said main valve member for reciprocating the latter; a pilot valve housing assembly mounted in normally fixed position in said casing adjacent the outer end of said cylinder; said housing assembly having an axial bore therethrough; a pilot valve plunger spaced from and independent of said main valve member reciprocally mounted in said housing assembly in position extending through said bore in axial alignment with said cylinder; said pilot valve plunger having an external diameter less than the diameter of said bore providing a fluid flow passage therepast through said bore; said pilot valve housing assembly and said piston forming therebetween a fluid pressure chamber within said cylinder; said casing and said pilot valve housing assembly being formed to provide a fluid flow passage therethrough from said inlet chamber to the axial bore through said housing assembly and from said axial bore to and discharging into said fluid pressure chamber within said cylinder; said piston and said main valve member being formed to provide a fluid exhaust passage therethrough from the end of said cylinder adjacent the outer end of said main valve member to and opening into said exhaust chamber; sealing ring members mounted in positions spaced axially of and concentric with said bore through said pilot valve housing assembly; said sealing ring members providing ports therethrough having annular valve seats therearound adapted to be selectively engaged in sealing contact with and disengaged from said pilot valve plunger; said pilot valve plunger being reciprocal between positions selectively engaged with and disengaged from said sealing ring members for alternately closing said exhaust passage from said cylinder and opening said pressure fluid passage to said chamber within said cylinder and opening said exhaust passage and closing said pressure fluid passage; and means for reciprocating said pilot valve plunger.

References Cited in the file of this patent

UNITED STATES PATENTS

| 796,005 | Obrien | Aug. 1, 1905 |
| 1,095,935 | Sheldon | May 5, 1914 |
| 1,791,570 | Orton | Feb. 10, 1931 |
| 2,230,644 | Horta | Feb. 4, 1941 |
| 2,240,079 | Roth | Apr. 29, 1941 |
| 2,285,323 | Beekley | June 2, 1942 |
| 2,319,578 | Beekley | May 18, 1943 |
| 2,479,359 | Holt | Aug. 16, 1949 |
| 2,524,142 | Seeloff | Oct. 3, 1950 |
| 2,624,542 | Ghormley | Jan. 6, 1953 |
| 2,645,450 | Chessman | July 14, 1953 |
| 2,661,182 | Kipp | Dec. 1, 1953 |

FOREIGN PATENTS

| 985,491 | France | of 1951 |